Oct. 18, 1960

G. M. HIPPLE 2,956,550

HYDRAULIC CONTROL APPARATUS

Filed April 2, 1957

2 Sheets-Sheet 1

INVENTOR.
GEORGE M. HIPPLE
BY
Donald J. Petruch,
AGENT.

Oct. 18, 1960 G. M. HIPPLE 2,956,550
HYDRAULIC CONTROL APPARATUS
Filed April 2, 1957 2 Sheets-Sheet 2

INVENTOR.
GEORGE M. HIPPLE
BY Donald J. Detrick,
AGENT.

United States Patent Office 2,956,550
Patented Oct. 18, 1960

2,956,550

HYDRAULIC CONTROL APPARATUS

George M. Hipple, Columbus, Ohio, assignor to American Brake Shoe Company, New York, N.Y., a corporation of Delaware Filed Apr. 2, 1957, Ser. No. 650,265

9 Claims. (Cl. 121—38)

This invention relates to signalling apparatuses for use in a hydraulic system for indicating or signalling a condition therein or altering the operation of the system in response to such condition.

One object of the invention is to provide an improved signalling apparatus of the type specifically set forth above.

Another object of the invention is to provide an improved signalling device for indicating or signalling the operation of a valve in a hydarulic system.

Another object of the invention is to provide an improved signalling apparatus for indicating a change in pressure in a hydraulic system.

Another object of the invention is to provide an improved indicating or signalling device for telling of a condition such, for example, as the operation of a valve or a change in pressure in a hydraulic system in such manner that other mechanism either in the hydraulic system or external thereof will be caused to respond to such condition.

More specifically it is another object of the invention to provide an improved electrical indicating or signalling apparatus for use in a hydraulic system which includes a pressure operated fluid pressure control, a device for controlling the operation of the fluid pressure control, and electrical indicating means operated in response to operation of the controlling device for indicating to the operator thereof the operation of said valve in any of numerous ways such, for example, as by an audible signal, a visual signal, by stopping the prime mover of the system, by reversing the direction of operation of a motor in the system, etc.

Further objects and advantages of the present invention will be apparent from the following description, reference being had to the accompanying drawings wherein a preferred form of embodiment of the invention is clearly shown.

Figure 1:
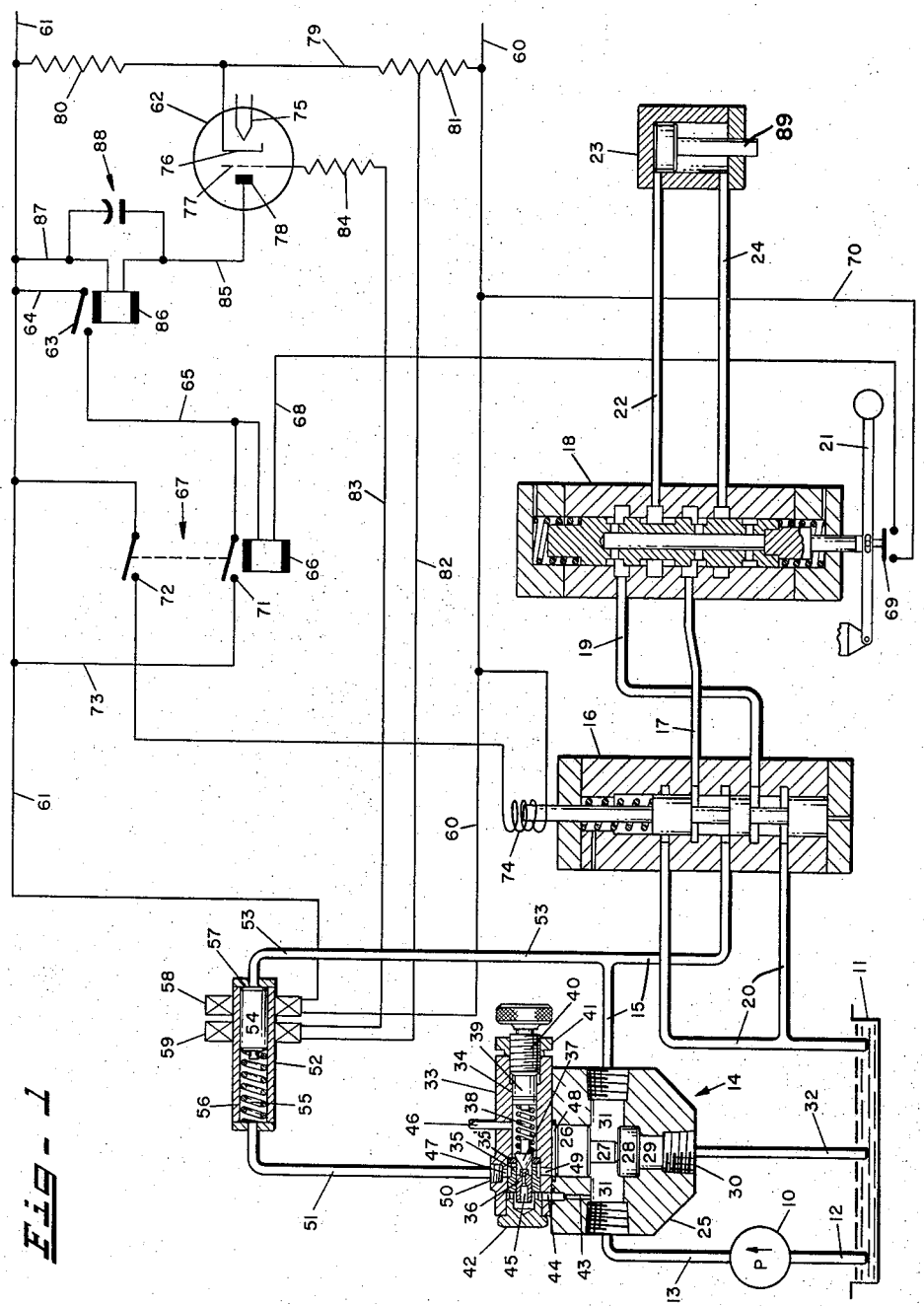
Figure 2:
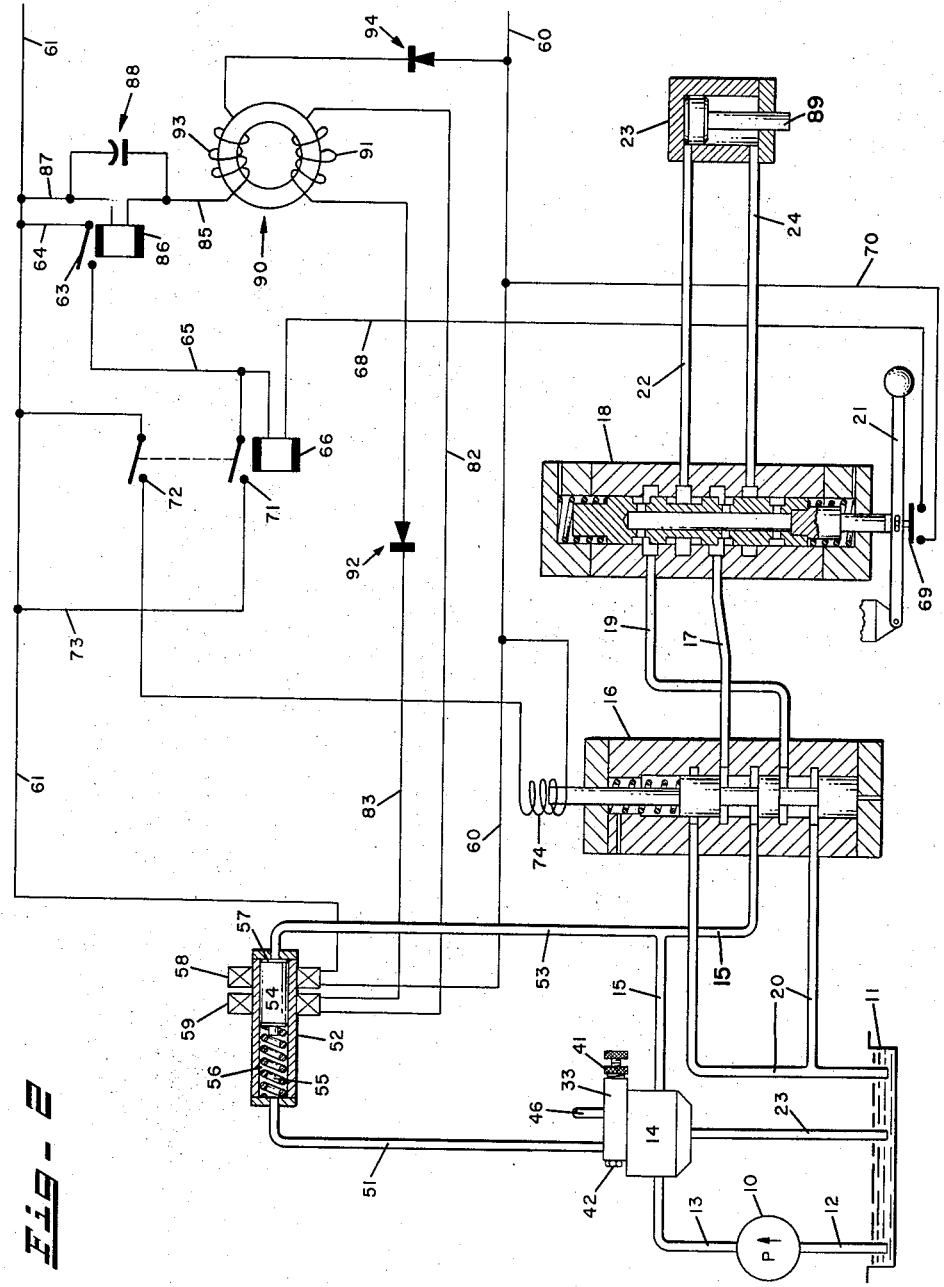

In the accompanying drawings:

Fig. 1 is a diagrammatic view of a control system including features of the invention, the system including both electric and hydraulic components and forming the operating system of a hydraulic press, and Fig. 2 is a diagrammatic view similar to Fig. 1 but showing modifications in the electrical portion thereof.

The hydraulic portion of the complete system seen in Fig. 1 of the drawings includes a source of fluid pressure in the form of pump 10 driven by an electric motor, not shown. Pump 10 receives hydraulic fluid from a reservoir 11 through a conduit 12 and fluid under pressure from the pump 10 flows through a conduit 13, a control valve 14 and a conduit 15 to a solenoid operated two position reversing valve 16. From the valve 16, the fluid flows through a conduit 17 to a separately manually operated three position motor reversing valve 18. The reversing valve 18 is a standard open center type four-way valve and when it is in its normal or center position, as shown, fluid from conduit 17 flows through the reversing valve 18 to a conduit 19 back to valve 16 and through a conduit 20 to tank 11. When the valve 18 is shifted downwardly from its neutral position by an operator's handle or lever 21, the connection between conduits 17 and 19 is interrupted or severed and a connection between conduit 17 and a conduit 22 leading to a double acting or reversible hydraulic motor 23 is established and fluid flowing therethrough drives motor 23 in one direction. Fluid exhausted from motor 23 flows through a conduit 24 to valve 18, conduit 19, valve 16 and conduit 20 to tank 11.

Valve 16 is a solenoid operated valve and when it is in its normal position, that is, when its solenoid is de-energized, the conduits 15, 17 are connected and conduits 19, 20 are connected.

When solenoid valve 16 is energized, the connections through it which have been described are severed and the conduits 15 and 19 are connected and conduits 17 and 20 are connected. It will thus be seen that if motor 23 is operating and valve 16 is operated that the direction of operation of the motor 23 will be reversed.

The flow control valve 14 herein shown as a pressure differential operated relief valve adapted to open when the pressure in conduits 13 and 15 reaches a predetermined maximum and it includes a body 25 having a central bore forming a cylindrical chamber in which a piston 26 reciprocates. Piston 26 includes, as an integral part thereof, a valve stem 27 which seats upon a seat ring 28 which is pressed against a shoulder in the central bore and in the mouth of a passage 29 also formed by the central bore and leading to a port 30 at the bottom thereof. A through passage 31 intersects the central bore above the valve seat 28 and below the piston 26. Fluid may flow through passage 31 at all times and it may flow from this passage 31 through passage 29 and a conduit 32 to tank 11 whenever the valve 27—28 is open.

The top of body 25 of valve 14 and the top of the cylinder in which piston 26 is housed is closed by a cap 33 in which a pressure operated control valve for controlling the operation of the pressure differential operated valve means 27, 28 is located. Cap 33 includes a bore 34 which contains a piston guiding insert 35 in which there is a "push off" piston 36 that acts against one end of a cone-type poppet valve 37. Poppet valve 37 is urged against a washer-like seat insert 35' by a spring 38 and an adjustable plunger apparatus including a plug 39, screw 40 and lock nut 41. Valve seat insert 35 is held in position by a screw threaded plug 42.

The valve body 25 includes a small diameter bore 43 which connects at one of its ends with the through passage 31 and at its other end with a bore 44 in cap 33 which conducts fluid from the passage 31 to the through bore 34 and one end of the push off piston 36. The piston 36 includes an axial bore 45 which is joined by lateral bores and these bores are of such diameter as to function as restrictors to the flow of fluid through the piston for a purpose which is set forth in detail hereinafter. It will thus be seen that fluid can pass from the passage 31 through the bores 43 and 44 to the through bore 34 and one end of the "push off" piston 36 and through the restrictor bores in piston 36 to the poppet valve 37. When poppet valve 37 is open, fluid may flow through it to tank 11 by passing into the bore 34 adjacent the spring 38 and to tank 11 through a drain port or passage 46.

Fluid which has passed through the piston 36 to the poppet valve 37 may also pass through radially extending openings in the valve seat insert to a circumferential groove 47 therein and from this groove to the chamber 48 in the bore at the top of valve piston 26 through a conduit 49.

The valve 14, which is here employed merely as an example of a flow control valve, is shown as a relief valve. This valve 14 is normally closed and it opens in response to an increase in pressure in the conduit or passage 31 above a pressure which is predetermined by the adjustment of the control valve 37. Valve 14 operates in this manner because the piston 26 has opposed, unequal areas which are normally exposed to equal pressures derived from the passage 31. The larger of these areas is in the chamber 48 and therefore the piston 26 and stem 27 is urged toward the seat 28 to isolate or disconnect the passage 29 from the passage 31. When the pressure in conduit or passage 31 exceeds the pressure setting at which poppet valve 37 does open and the valve 37 opens, the pressure in chamber 48 is reduced and the pressure below piston 26 in conduit 31 forces the piston 26 and valve stem 27 upwardly to open the differential pressure operated valve 27—28 whereupon fluid may flow from the passage 31 through passage 29 and conduit 32 to tank 11 and the fluid pressure in conduit 31 will be relieved or reduced. Valve 27—28 will remain open so long as the pressure operated poppet valve 37 remains open because the volume of fluid which can flow through the restricted passage including conduits 43 and 44, bore 45 in piston 36 and conduit 49 is restricted and the pressures on opposite ends of piston 26 cannot become equalized until poppet valve 37 closes.

The cap 33 of valve 14 is also provided with a port or passage 50 which connects with the circumferential groove 47 in valve seat insert 35. It will, of course, be seen that this port or passage 50 is connected with both the poppet valve 37 and the passage 31 through the passage means above-described and that this port is in turn connected through a passage means in the form of a conduit 51 with one end of a cylinder 52 which is formed of non-magnetic material. The other end of cylinder 52 is connected through a conduit or passage 53 with the high pressure passage 31 and the cylinder 52 contains an armature in the form a piston 54 which is formed of magnetic material and which is urged to the position shown in Fig. 1 of the drawings by a spring 55. The piston 54 is moved from the position shown by differences in pressure in the chambers 56 and 57 at its opposite ends and in the cylinder 52. It will be obvious from the foregoing description that when the pressure operated poppet valve 37 is closed that the pressures in chambers 56 and 57 will be equal and that the armature 54 will be held by the spring 55 in its normal position as shown. It will also be obvious that upon the opening of poppet valve 37 the pressure in chamber 56 will be reduced and that the pressure in chamber 57 will move the armature 54 from its normal position shown to the left against the spring 55.

The cylinder 52, armature 54 and spring 55 actually form a part of an electric indicator or signalling means for indicating the opening operation of the pressure operated control valve 37 which valve 37 controls the action of the differential pressure operated valve 27—28 and consequently the opening or operating condition of this latter valve as well as the pressure condition within the conduit or passage 31. The cylinder 52 extends through primary and secondary electric conductors in the form of primary and secondary electric coils 58 and 59 respectively, in such manner that the armature 54 when it is in its normal position, as shown, will be positioned within the coils to induce a maximum voltage from the primary coil 58 into the secondary coil 59.

The primary coil 58 receives alternating electric current at, for example, 110 volts from a pair of main lead wires 60 and 61 and this coil remains energized at all times during the operation of the system. When the armature 54 is in the position shown in the drawings, a maximum voltage is induced into the secondary coil 59 and as the armature is moved to the left the voltage induced into the coil 59 is reduced. The voltage induced into coil 59 is employed to control an electric valve in the form of a thyratron tube 62 which, in turn, controls the operation of a normally open solenoid operated switch 63. When switch 63 closes, it establishes an electrical connection through a lead line 64 connected with the main lead wire 61 to a lead 65 connected to one side of the solenoid coil 66 of a second solenoid operated switch 67. The other side of solenoid coil 66 is connected to main lead wire 60 through a lead 68, a normally open manually operated switch 69 associated with the control handle or lever 21 and a lead 70. Switch 67 includes two normally open sets of contacts 71 and 72 and when it is energized contacts 71 are closed to establish a holding circuit for the solenoid coil 66 from lead 65 through the contacts 71 and a lead 73 to main lead 61. Also, when switch 67 is energized, the contacts 72 are closed to establish an electric circuit from main lead 61 through the solenoid coil 74 of valve 16 to the other main lead 60.

The thyratron tube 62 includes the usual filament 75 which is heated in the usual manner, a cathode 76, grid 77 and an anode or plate 78. The cathode 75 is connected to a lead 79 between a pair of resistors 80 and 81. Resistor 80 is connected to main lead wire 61 and resistor 81 is connected to main lead wire 60. One lead 82 of the secondary coil 59 is connected through a tap to the resistor 81 and the other lead 83 is connected through a resistor 84 to the grid 77 of the thyratron tube 62. The plate 78 of thyratron tube 62 is connected through a lead 85 to one side of the solenoid coil 86 of switch 63 and the other lead of this coil is connected to main lead wire 61 through a lead 87.

When armature 54 is in its normal position, as shown, and the maximum voltage is induced into secondary coil 59, this voltage, which is applied to grid 77, prevents the thyratron tube 62 from conducting current, but when the armature 54 is shifted from the position shown and less voltage is induced into secondary coil 59 and consequently a lesser voltage is applied to grid 77, the thyratron tube 62 will conduct pulsing direct current. This pulsing direct current will operate solenoid operated switch 63 to complete the electric circuit for solenoid coil 66 and when switch 67 is closed the circuit for solenoid operated valve 16 is completed whereupon valve 16 causes reverse operation of motor 23. In order to prevent chattering of the switch 63, a capacitor 88 is connected between lead lines 85 and 87.

In the operation of the system or circuit shown, when the operator of the press desires the piston and ram 89 to move from the position shown in Fig. 1 of the drawings, he depresses the handle or lever 21. Depressing the lever 21 closes the manually operated switch 69 and shifts the spool of valve 18 whereupon the valve 18 directs fluid under pressure from conduit 15 through conduit 22 to the top of motor 23 and the bottom of motor 23 is connected through conduit 24, valve 18, conduit 19, valve 16 and conduit 20 to tank 11. Should the operator of the press hold the lever 21 in its depressed position and the piston and ram 89 reach the end of their stroke or should the ram engage work and cause the pressure in passage means 31 of valve 14 to increase sufficiently to open valve 14, the armature 54 will be moved to the left to reduce the voltage induced into secondary coil 59. This reduction in voltage in coil 59 causes thyratron tube 62 to energize solenoid 86 and therefore to close switch 63. The closing of switch 63 energizes solenoid 66 which closes switch 67 which energizes the solenoid operated reversing valve 16 and the piston and ram 89 will be caused to travel upwardly or in the opposite direction. The piston and ram will continue to travel in this reverse direction until they reach the upper limit of their stroke if the lever 21 is held depressed. Should the operator fail to release the lever or handle 21 when the piston and ram reach the upper limit of their travel the relief valve 14 will open to bypass the output volume of pump 10 to tank 11 through conduit 32. If the lever 21 is released and the spool of valve 18 moves to its center or neutral position, the switch 69 will be opened to break the holding circuit for solenoid 66 and fluid flowing in conduit 17 will flow through valve 18 to tank conduit 19. When the spool valve 18 is in its center or neutral position, the conduits 22 and 24 are blocked and the piston and ram will remain stationary. When the lever 21 is elevated to move the spool of valve 18 to its uppermost position, conduit 17 will be connected to conduit 24 and conduit 22 will be connected with conduit 19 whereby the ram will be returned to its uppermost position. If the lever is held in its uppermost position after the piston and ram reach the upper limit of their travel, the relief valve 14 will open to bypass the output volume of pump 10 to tank 11 through conduit 32.

It will be seen from the foregoing description that when the invention is employed in a hydraulic press, for example as by the simplified circuit or system illustrated in the drawing, that whenever the pressure in conduit or passage 31 of valve 14 reaches the maximum predetermined by the pressure operated control valve 37 and switch 69 is closed that the solenoid valve 16 will be operated to reverse the direction of travel of the press motor 23. It is also to be understood that the device to be operated may be something other than the solenoid operated valve 16 such, for example, as a visual or audible signal or it may even be another device entirely remote from the press circuit. It is also to be understood that while the valve 14 is herein described as a relief valve that it may take any form of pressure or flow control device which operates upon the general principles described.

The modified circuit or system shown in Fig. 2 of the drawings is similar in many respects to the circuit or system seen in Fig. 1 and those elements in this system which are identical to those of the circuit of Fig. 1 carry the same numerals. The circuit of Fig. 2 differs from that of Fig. 1 chiefly in that an electric valve in the form of a toroid or saturable reactor 90 is substituted for the thyratron tube 62.

In the circuit or system of Fig. 2, the secondary conductor or coil 59 is connected to the control or reset coil 91 of the toroid 90 through a half wave rectifier 92 and the controlled or gating coil 93 of the toroid is connected through a half wave rectifier 94 from main line 60 with one side of the solenoid coil 86 of the switch 63. The other side of coil 86 is connected through lead 87 with the main line 61.

In the operation of this modified circuit or system, when maximum voltage is being induced into primary coil 59 and supplied to the control or reset coil 91, insufficient electric current is conducted through the controlled or gating coil 93 to energize the solenoid coil 86 and as the voltage applied to coil 91 is decreased sufficient current will flow through coil 93 to energize coil 86.

While the form of embodiment of the present invention as herein disclosed constitutes a preferred form, it is to be understood that other forms might be adopted, all coming within the scope of the claims which follow:

I claim:

1. In a control system for operating a reversible fluid motor, said system including a pressure source and a reversible fluid motor; a relief valve, a solenoid operated reversing valve and a normally centered four-way valve connected between said pressure source and said motor; means including primary and secondary coil means and an armature movable with respect thereto for inducing different voltages in said secondary coil means; means for moving said armature as aforesaid upon the opening of said relief valve; normally open switch means closed when said four-way valve is moved to a position to cause operation of said motor in one direction, said switch means forming a part of an electric circuit for the solenoid coil of a first switch, said circuit including contacts of a second solenoid operated switch; electric valve means operated in response to a decrease in voltage in said secondary coil means caused by the opening of said relief valve to energize the coil of said second switch thereby causing the coil of said first switch to be energized, said first switch including contacts in a holding circuit around the contacts of said second switch and contacts in a circuit for energizing the coil of said solenoid operated valve.

2. In a control system for operating a reversible fluid motor, said system including a pressure source and a reversible fluid motor; a relief valve, a solenoid operated reversing valve and a separately operated normally centered four-way valve connected between said pressure source and said motor; normally open switch means closed when said separately operated valve is moved to a position to cause operation of said motor in one direction, said switch means forming a part of an electric circuit for the solenoid coil of a first switch, said circuit including contacts of a second solenoid operated switch; electric valve means connected to energize the coil of said second switch thereby causing energization of the coil of said first switch, said first switch including contacts in a holding circuit around the contacts of said second switch and contacts in said circuit for energizing the coil of said solenoid operated valve, and means operated by a pressure condition in the fluid system for causing said electric valve to energize the coil of said second switch.

3. In a control system for operating a reversible fluid motor, said system including a pressure source and a reversible fluid motor; a relief valve, a solenoid operated reversing valve and a separately operated valve connected between said pressure source and said motor; normally open switch means closed when said separately operated valve is moved to a position to cause operation of said motor, said switch means forming a part of an electric circuit for the solenoid coil of a first switch, said circuit including contacts of a second solenoid operated switch; electric valve means connected to energize the coil of said second switch thereby causing energization of the coil of said first switch, said first switch including contacts in a holding circuit around the contacts of said second switch and contacts in said circuit for energizing the coil of said solenoid operated valve, and means operated by a pressure condition in the fluid system for causing said electric valve to energize the coil of said second switch.

4. In a control system for operating a fluid motor, said system including a pressure source and a fluid motor; a relief valve, a solenoid operated four-way valve and a separately operated valve connected between said pressure source and said motor; normally open switch means closed when said separately operated valve is moved to a position to cause operation of said motor, said switch means forming a part of an electric circuit for the solenoid coil of a first switch, said circuit including contacts of a second solenoid operated switch; electric valve means connected to energize the coil of said second switch thereby causing energization of the coil of said first switch, said first switch including contacts in a holding circuit around the contacts of said second switch and contacts in said circuit for energizing the coil of said solenoid operated valve, and means operated by a pressure condition in the fluid system for causing said electric valve to energize the coil of said second switch.

5. In a control system, a fluid pressure source; reversible means to be operated by fluid pressure derived from said pressure source; a pressure control, a solenoid operated reversing valve and a separately operated reversing valve connected between said pressure source and said means to be operated; an electric circuit for operating said solenoid operated valve, said circuit including switch means operated with said separately operated valve, an electric valve, and means responsive to a pressure condition in said pressure control for actuating said electric valve.

6. In a control system, a fluid pressure source; reversible means to be operated by fluid pressure derived from said pressure source; a fluid pressure control, a solenoid operated reversing valve and a separately operated reversing valve connected between said pressure source and said means to be operated; means including primary and secondary coils and an armature movable with respect thereto for inducing different voltages in said secondary coil; means for moving said armature as aforesaid in response to a change in pressure in said pressure control, and circuit means responsive to a change in voltage in said secondary coil to operate said reversing valve.

7. In a control system, a fluid pressure source; means to be operated by fluid pressure derived from said pressure source; a fluid pressure control and a solenoid operated valve connected between said pressure source and said means to be operated; means including primary and secondary coils and an armature movable with respect thereto for inducing different voltages in said secondary coil; means for moving said armature as aforesaid in response to a change in pressure in said pressure control; and circuit means responsive to a change in voltage in said secondary coil to operate said reversing valve.

8. In a control system, a fluid pressure source; reversible means to be operated by fluid pressure derived from said pressure source; a relief valve, a solenoid operated reversing valve and a separately operated reversing valve connected between said pressure source and said means to be operated; means including primary and secondary coils and an armature movable with respect thereto for inducing different voltages in said secondary coil; means for moving said armature as aforesaid in response to the operation of said relief valve, and circuit means responsive to a change in voltage in said secondary coil to operate said reversing valve.

9. In a control system, a fluid pressure source; means to be operated by fluid pressure derived from said pressure source; a relief valve and a solenoid operated valve connected between said pressure source and said means to be operated; means including primary and secondary coils and an armature movable with respect thereto for inducing different voltages in said secondary coil; means for moving said armature as aforesaid in response to the operation of said relief valve, and circuit means responsive to a change in voltage in said secondary coil to operate said reversing valve.

References Cited in the file of this patent

UNITED STATES PATENTS

| | | |
|---|---|---|
| 1,035,572 | Gasch | Aug. 13, 1912 |
| 2,043,453 | Vickers | June 9, 1936 |
| 2,613,703 | Calvert | Oct. 14, 1952 |
| 2,716,766 | Gulbrandsen | Sept. 6, 1955 |
| 2,735,405 | Hipple | Feb. 21, 1956 |
| 2,766,731 | Brandes | Oct. 16, 1956 |
| 2,772,409 | Reid | Nov. 27, 1956 |